Patented Nov. 20, 1945

2,389,203

UNITED STATES PATENT OFFICE 2,389,203

CONDENSED HALOGENATED TALL OIL PRODUCTS AND METHOD FOR MAKING THE SAME

Eugene Lieber, Staten Island, N. Y., assignor to Standard Oil Development Company, a corporation of Delaware No Drawing. Original application October 12, 1938, Serial No. 234,633. Divided and this application July 19, 1940, Serial No. 346,291

9 Claims. (Cl. 260—97.5)

The present invention relates to improvements in lubricants and more specifically to a new class of wax modifying agents useful for blending with waxy lubricating oils, to reduce their pour points, and also for use as separation aids in the process of separating wax from oil and for use in other processes where it is desirable to modify the crystal structure of waxes. The invention will be fully understood from the following description.

It has been found that powerful wax modifying agents can be prepared from "tall oil" by condensing the same with suitable cyclic organic compounds. "Tall oil" is a by-product recovered from the paper industry. It is an organic product, a mixture of acids, esters and non-saponifiables varying in composition from time to time depending principally on the details of the method of preparation and refining. Ordinarily the acid number of such a product is from 110 to 170, the saponification from about 125 to 190, and the iodine number is usually from about 100 to 130, but in some instances a material of lower or higher acid numbers can be obtained. The product contains resin acids which, however, differ considerably from abietic acid in that they have relatively low melting points and are esterified only with considerable difficulty. The product also contains so-called fatty acids, the chemical nature of which is not well understood, as well as higher alcohols.

In making the new wax modifiers, the "tall oil" is first halogenated by treatment with halogenating agents such as free halogens, sulfur or phosphorus halides. Of these materials, free chlorine, the sulfur and phosphorus chlorides or oxy chlorides are preferred. Phosphorus chloride is quite effective and ordinarily about one part by weight is sufficient to halogenate 3 to 4 parts by weight of "tall oil" to the degree required for the present purpose. Equivalent quantities of the other halogenating agents should be employed in order to obtain the same degree of halogenation.

The halogenated "tall oil" prepared as above is admixed with a relatively large proportion of a suitable cyclic organic compound and condensation of these substances is then carried out as will be disclosed below. Among the suitable cyclic compounds may be mentioned the aromatic hydrocarbons such as benzene, naphthalene, diphenyl and their alkylated derivatives such as toluene and xylene. Hydroaromatics such as tetra and decahydronaphthalene may also be employed. Another class of suitable substances are the phenols such as ordinary phenol, the naphthols or alkylated phenols, and similar amino products may be used. Aromatic esters, ketones and ethers may also be used. Among the latter may be mentioned anisole, diphenyl ether and diphenylene oxide. Heterocyclic compounds may also be employed in place of the aromatics mentioned above and among these carbazole, thiophene, furane and related compounds can be employed.

The proportion of the two ingredients is of importance. If too large an amount of the halogenated "tall oil" is employed the wax modifying properties are weak or in some cases absent altogether, but as the amount of the tall oil is decreased very active products are obtained. Ordinarily the amount of the aromatic or cyclic compound should be in excess of the tall oil and good results are obtained using say 100 parts of the former to 25 parts of the latter, while if these proportions are reversed the product has little wax modifying power.

The condensation takes place in the presence of suitable condensing agents, particularly Friedel-Crafts catalysts, such as aluminum chloride, zinc chloride or boron fluoride, at temperatures below about 250° F., but preferably in the range from room temperature to 130° F. The condensation may be effected in the presence of solvents such as kerosene, naphtha, carbon disulfide or chlorinated hydrocarbons, especially the saturated ones such as tetrachlor ethane. The reaction time may be varied considerably depending on temperature and the amount of catalyst, but ordinarily one or two hours are sufficient for present purposes. After this time the catalyst is hydrolyzed by the addition of water or a mixture of water and alcohol and the active ingredients are extracted from the products of the catalyst hydrolysis by means of a solvent such as kerosene. The desired modifying agent is then recovered from the kerosene or other solvent as a distillation residue. The product as recovered is a very viscous greenish to brownish oil which is often semi-solid at room temperatures. It is sticky or tacky to the touch and may be pulled out into long threads. When employed as a wax modifying agent, these products are added in proportion of 2 to 3%. Ordinarily 1% is sufficient to give a marked pour depression in a waxy lubricating oil and the same amount may ordinarily be employed in the separation of wax from oil.

Example 1

Several modifying agents were prepared from tall oil and different cyclic organic compounds by the following procedure:

To 25 grams of "tall oil" are added 7 grams of phosphorus trichloride and the mixture is heated for about 60 minutes at 175° to 190° F. Under these conditions the "tall oil" is halogenated and this product separates from phosphorus acid and is decanted. The halogenated product is mixed with 100 grams of the particular cyclic compound and the mixture is then taken up to 150 cc. of tetrachlor ethane which serves as a solvent. 10 grams of aluminum chloride are then slowly added while stirring and the temperature is allowed to rise without cooling. In some instances the temperature may rise to 125 to 135° F., and after all the catalyst has been added the mixture is heated to between about 175° to 185° F., for about an hour.

The reaction mixture is then cooled and diluted with 500 cc. of kerosene. The mixture of water and alcohol is then added to hydrolyze the catalyst and the kerosene layer is taken off and washed several times with a water-alcohol mixture. The kerosene is then distilled off with fire and steam to a temperature of about 600° F., and the condensation product is recovered as a distillation residue. It is a very viscous oil ordinarily of greenish to brownish color.

In the table given below is included a list of various cyclic compounds used, and it will be understood that a condensation product with the halogenated "tall oil" was prepared from each of these compounds by the procedure outlined above. 1% of each of the condensation products was added to different samples of a waxy lubricating oil having a normal pour point of 30° F., and in the table the pour point of each resulting blend is given. It can be readily seen that large depressions are obtained.

| Condensation of tall oil with aromatic | Pour point, °F. |
|---|---|
| Benzene | −5 |
| Diphenyl | −10 |
| Diphenylene oxide | 0 |
| Amyl phenol | 0 |
| Xylenol | −20 |
| Naphthalene | 0 |
| Tetralin | 0 |

This application is a division of application Serial Number 234,633 filed October 12, 1938.

I claim:

1. An improved wax modifier comprising a Friedel-Crafts condensation product of about one part by weight of halogenated "tall oil" and about 3 to 4 parts by weight of an aromatic organic compound.

2. Product according to claim 1 in which the aromatic compound is an aromatic hydrocarbon.

3. An improved wax modifying agent comprising an aluminum chloride condensation product of about 1 part of halogenated "tall oil" with 3 to 4 parts of an aromatic hydrocarbon.

4. Product according to claim 1 in which the aromatic compound is a phenolic compound.

5. Product according to claim 1 in which the aromatic compound is an alkylated phenolic compound.

6. Product according to claim 1 in which the aromatic compound is xylenol.

7. The process which comprises halogenating about 25 parts by weight of "tall oil" with phosphorous trichloride at about 175–190° F., and condensing the resultant halogenated "tall oil" with about 100 parts by weight of an aromatic compound in the presence of an inert solvent and in the presence of about 10 parts by weight of aluminum chloride at a reaction temperature not exceeding about 185° F., hydrolyzing and removing the catalyst and distilling the reaction products with fire and steam at about 600° F.

8. Process according to claim 7 in which the aromatic compound used in xylenol.

9. The process which comprises condensing about 1 part by weight of chlorinated "tall oil" with about 3 to 4 parts by weight of an aromatic hydrocarbon in the presence of a Friedel-Crafts catalyst at a temperature of about 70–130° F., treating the reaction product with a hydrolyzing agent, extracting the desired condensation product from the reaction mass by a volatile solvent, and subjecting the resulting extract solution to distillation with fire and steam at about 600° F. to remove volatile constituents and to obtain a relatively non-volatile residue.

EUGENE LIEBER.